United States Patent
Goldrick (10) Patent No.: US 6,796,890 B1
(45) Date of Patent: Sep. 28, 2004

(54) EXTENDABLE WET SAW WATER SHIELD

(76) Inventor: Edward K Goldrick, 203 Grand Blvd., Deer Park, NY (US) 11729

( * ) Notice: Subject to any disclaimer, the term of this patent is extended or adjusted under 35 U.S.C. 154(b) by 25 days.

(21) Appl. No.: 10/369,486

(22) Filed: Feb. 20, 2003

(51) Int. Cl.[7] .......................... B23Q 11/08; B23D 47/00
(52) U.S. Cl. ...................... 451/454; 451/455; 451/449; 451/453; 125/12; 220/4.01
(58) Field of Search ................................ 451/451–457, 451/449–450, 358; 125/12.13, 13.01; 83/169; 220/4.01, 3, 8

(56) References Cited

U.S. PATENT DOCUMENTS

| | | | |
|---|---|---|---|
| 665,380 A | * 1/1901 | Barnes | ........................ 451/450 |
| 1,047,571 A | 12/1912 | Sadler | |
| 1,120,955 A | * 12/1914 | Martin | ........................ 229/101 |
| 1,664,431 A | * 4/1928 | Ringer | ........................ 220/4.01 |
| 1,824,000 A | 9/1931 | Walter | |
| 2,491,957 A | * 12/1949 | Dilley | ........................ 160/351 |
| 2,579,193 A | * 12/1951 | Kosbab | ........................ 451/283 |
| 3,341,983 A | * 9/1967 | Baldenhofer et al. | ........ 451/450 |
| 3,998,254 A | * 12/1976 | Morin | ........................ 144/35.1 |
| 4,068,648 A | 1/1978 | Erdman | |
| 4,423,568 A | 1/1984 | Gould | |
| 4,754,581 A | * 7/1988 | Lengyel et al. | .............. 451/453 |
| 4,779,603 A | 10/1988 | Crocetti | |
| 4,811,527 A | 3/1989 | Ruopsa | |
| 4,962,685 A | * 10/1990 | Hagstrom | ..................... 83/397 |
| 4,976,251 A | 12/1990 | Smith | |
| 5,577,955 A | 11/1996 | Voege | |
| 5,718,620 A | * 2/1998 | Tanaka et al. | .............. 451/288 |
| 5,741,175 A | 4/1998 | Voege | |
| 5,855,291 A | * 1/1999 | Ingle | .............................. 220/6 |
| 5,875,912 A | * 3/1999 | Hobson | ..................... 220/4.03 |
| 5,897,430 A | 4/1999 | Haller | |
| 6,257,222 B1 | 7/2001 | Kaeser | |
| 6,422,228 B1 | * 7/2002 | Latham | ................... 125/13.01 |
| 6,557,602 B1 | * 5/2003 | Sorensen et al. | ......... 144/286.5 |
| 6,691,884 B1 | * 2/2004 | Dwyer | ....................... 220/4.03 |
| 6,712,677 B2 | * 3/2004 | Williams et al. | .............. 451/89 |

* cited by examiner

Primary Examiner—George Nguyen
(74) Attorney, Agent, or Firm—Michael I. Kroll (57) ABSTRACT

The present invention is a splash shield housing for encompassing wet saws having a trough positioned along the interior of the housing for containing the overspray. The housing can be extended to encompass three sides of a wet saw with the extension maintaining the integrity of the housing. Positioned above the trough on the back side is a splash guard comprised of an extendable retractable impermeable sheet having means for extending and attaching the sheet to the back table lip to prevent any overspray coming back between the table and rear wall trough.

13 Claims, 8 Drawing Sheets

EXTENDABLE WET SAW WATER SHIELD

BACKGROUND OF THE INVENTION

1. Field of the Invention

The present invention relates generally to shields for power tools and, more specifically, to a splash shield housing for wet saws that contains and controls the overspray kicked out by the rotating saw blade. The housing forms a shell on three sides and extends across the top. The housing is formed of two opposing halves with one half having an extension member whereby the opposing sides can be spaced apart without compromising the integrity of the housing. The opposing side has channels for receiving the edges of the extension member allowing the hosing to be extended to a position to encompass most wet saws and moved to a point where the edges of the wet saw are positioned over the housing trough positioned along the interior of the housing. The shield further provides a splash guard comprised of an extendable retractable impermeable sheet having means for extending and attaching the sheet to the back table lip to prevent any overspray coming back between the table and rear wall trough.

2. Description of the Prior Art

There are other shield devices for use with power tools. Typical of these is U.S. Pat. No. 1,047,571 issued to L. E. Sadler on Dec. 17, 1912.

Another patent was issued to O. Walter on Sep. 22, 1931 as U.S. Pat. No. 1,824,000. Yet another U.S. Pat. No. 2,491,957 was issued to W. Dilley on Dec. 20, 1949 and still yet another was issued on Jan. 17, 1978 to P. M. Erdman as U.S. Pat. No. 4,068,648.

Another patent was issued to L. L. Gould on Jan. 3, 1984 as U.S. Pat. No. 4,423,568. Yet another U.S. Pat. No. 4,779,603 was issued to L. C. Crocetti on Oct. 25, 1988 and still yet another was issued to J. A Ruopsa on Mar. 14, 1989 as U.S. Pat. No. 4,811,527 and A. L. Smith was issued U.S. Pat. No. 4,976,251 on Dec. 11, 1990. U.S. Pat. No. 5,741,175 was issued on Apr. 21, 1998 to R. E. Voege who was also issued U.S. Pat. No. 5,577,955 on Nov. 16, 1996. On Apr. 27, 1999 Hubert Haller was issued U.S. Pat. No. 5,897,430 and Michael Kaeser was issued U.S. Pat. No. 6,257,222 on Jul. 10, 2001.

In a polishing hood, a base board having a triangular major portion and a front extension, a metal frame having side panels, a to panel, and a back panel secured to the base board. Glass plates in the side panels and the top panel, a back plate in the back panel, a section of felt covering and secured to the back plate, a metal clamp carried by the top panel at the front side thereof, and a downwardly inclined glass guard having one side secured in said clamp.

In a machine of the kind described, a water deflecting guard with a longitudinal slot in the bottom thereof for the upper portion of the rotary cutter and the bottom of the guard having a trough adjacent each side of the cutterslot and sloping rearwardly and the rear part of the bottom of the guard sloping downward and provided at it's rear end with an opening for receiving all the water from the guard below and discharging it into the water tank below.

An industrial safety shield comprising a resiliently flexible shield of plastic material and a plurality of separate permanently magnetic means secured thereto in spaced relation to each other, said magnetic means having pole faces of opposite polarity exposed for contact with the support and said magnetic means being operative when engaged with the support, to hold the shield in flexed condition against it's self-restoring force, whereby the whereby the shield flexed to the desired position and anchored magnetically at said other portion of the shield while the shield is flexed to said desired position.

A rotating brick saw has an enclosure which substantially surrounds a rotating saw, a sliding table which carries a brick into the saw and tracks on which the table slides. The enclosure has an opening at its distal end and a pit beneath the opening for collecting sawed particles. The sliding table has a wiper at its distal end to wipe sawed particles along a base of the enclosure into the opening and pit. A door closes an opening at the front of the enclosure, and the door has a flexible wiper at its base which wipes the table as it slides outward of the enclosure. A chute on the door guides sawed particles downward to the table and through an aperture in the table into a pit near a proximal end of the saw enclosure. The rear wall and front door of the enclosure are sloped inward to further aid in the deflection of sawed particles toward the particle-collecting pits.

A splash shield and cuttings guard for a glass router comprises a side shield and an eye shield formed of transparent plastic sheet material. The side shield consists of a C-shaped horizontal base plate with an upstanding wall about the outer margin and a depending flange about the inner margin, the flange fitting over the rim of a glass router housing about the back and sides of a work table above a liquid coolant reservoir. Liquid flung outwardly by the router grinding wheel is intercepted by the wall and returned via the base plate and the depending flange to the reservoir for reuse. The eye shield consists of an upstanding section in front of the housing, a diagonal section at the top thereof extending rearwardly over the router work table, and a rearwardly extending lower flange with openings engaging feet on the bottom of the router housing.

An improved shielding against splash of rearward-ejected slurry and dust provides a circular-saw brick-sawing container with a broad shield having a front edge overlapping the saw shroud, and in turn having a rear edge overlapped by a fixed horizontal shield connected with an upright fixed shield spaced from the saw container backsplash. A "Z"-shaped member resiliently connects the broad shield with the saw arm permitting a close, moving overlap at the aforementioned rear edge overlapped by the fixed horizontal shield. Laterally spaced vertical fixed-shields respectively adjacent an angled end of the broad shield splash container at the sides and a half-moon shaped array of spray nozzles wet down dust of dry sawing, controlled by a three-way valve that also controls a saw-wetting spray, both with recirculated, screened water from a catch pan base.

Improved abrading apparatus. The apparatus includes a rotating abrasive stone and, to minimize the quantity of abraded particles which escape from the apparatus into the surrounding environment, utilizes a closed circuit air flow and utilizes a protective air curtain between the rotating abrasive stone and a user.

A tile saw having a liquid reservoir and a rotary saw blade protruding through a saw table, the rotary blade picking up liquid from said liquid reservoir as it rotates, the liquid being used to cool the rotary blade as it cuts, comprising a means for maintaining the circulation of liquid from the liquid reservoir to the rotary blade as it cuts and back to the reservoir with no significant splashing or loss of liquid, and means for cutting past the rotary blade without interfering with the maintained circulation of liquid which cools the rotary blade. The rotary blade protrudes through a thin slit in the saw table so that a tile is provided with support as it is cut, whereby precision cuts can be made to the tile.

A plastic shield for a tile saw includes two vertical side panels, a back panel and a top panel, which in one embodiment are dismantlable separate panels. The components are quickly assembled together via slotted edges or connecting extrusions and when dismantled stack flatly within the water tray which is included as part of the tile saw apparatus. The tile saw shield is configured to allow normal use of the tile saw, without encumbering the user. It contains water from spraying out of the tray, to the extent that the tile saw can be used in an interior setting. In a second embodiment the shield is made of a single, integral piece of relatively rigid sheet material, such as "corrugated" plastic material, with fold lines enabling the shield to be erected by folding. Tabs and slots secure the shield together, without fasteners.

A plastic shield for a tile saw includes two vertical side panels, a back panel and a top panel, which in one embodiment are dismantlable separate panels. The components are quickly assembled together via slotted edges or connecting extrusions and when dismantled stack flatly within the water tray which is included as part of the tile saw apparatus. The tile saw shield is configured to allow normal use of the tile saw, without encumbering the user. It contains water from spraying out of the tray, to the extent that the tile saw can be used in an interior setting. In a second embodiment the shield is made of a flexible canopy with three sides and a top, supported by a bent rod frame which itself is secured in releasable fashion to fixed structure of the tile saw apparatus.

A protective enclosure for a machine tool is constructed so as to be a free standing assembly completely independent from the machine tool. The protective enclosure is provided on rollers so that unimpeded access may be had to the machine tool by rolling away the protective enclosure. The protective enclosure is further provided with a safety locking system for interrupting operation of the machine tool if the protective cover is removed during operation or preventing starting of the machine tool if the protective cover is not fully in place.

A canopy for a wet saw including a cover member adapted for extending between the motor portion and the water pan of the wet saw. The cover member has a main panel and a pair of opposed side panel. An upper edge of the main panel has a pair of tabs extending upwardly therefrom. Upper fastening means are coupled with the tabs of the upper edge of the main panel of the cover member and with the motor portion of the wet saw to facilitate securement of the cover member to the wet saw. Lower fastening means are coupled with the main panel of the cover member upwardly of the lower edge thereof and with the water pan of the wet saw to facilitate securement of the cover member to the wet saw.

While these power tool shield devices may be suitable for the purposes for which they were designed, they would not be as suitable for the purposes of the present invention, as hereinafter described.

SUMMARY OF THE PRESENT INVENTION

A primary object of the present invention is to provide a wet saw water shield that will control and contain the overspray kicked out from the rotation of a wet saw blade.

Another object of the present invention is to provide an expandable wet saw water shield that will allow a contractor, homeowner or any person operating a wet saw to work in close proximity to the work area, such as an interior location with finished floors, because any errant liquid would be confined within the present invention.

Yet another object of the present invention is to provide an expandable wet saw water shield that traps and contains any excess fluid in a recycling trough where it may be returned to the saw unit.

Still another object of the present invention is to provide an expandable wet saw water shield that will reduce job costs by reducing the amount of time and distance needed to travel back and forth from the saw to the work area for each cut.

Another object of the present invention is to provide an expandable wet saw water shield that is lightweight and portable.

Still yet another object of the present invention is to provide an expandable wet saw water shield that is adjustable in height and width and may be adapted to be used in conjunction with various sized tables and saws.

Yet another object of the present invention is to provide a wet saw water shield that is inexpensive to manufacture and operate.

One more object of the present invention is to provide a wet saw water shield that is simple and easy to use.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the portable audio/video entertainment system of the present invention. With regard to the reference numerals used, the following numbering is used throughout the various drawing figures.
10 Portable extendable retractable wet saw shield
12 wet saw extendable retractable cover
14 first side of cover
16 second side of cover
18 first side abutment member
20 second side abutment member
22 tongue of cover
24 first groove of cover
26 second groove of cover
28 first trough section
30 second trough section
32 tongue of trough
34 trough rubber seal
36 trough channel
38 facing of shield
40 interior wall of shield
42 exterior wall of shield
44 backsplash housing
46 backsplash
48 spring loaded roller
50 spring
52 hook
54 waterproof light fixture
56 water pump with self activating float
60 telescoping legs
62 extendable member
64 receiving member
66 throughbore
68 fastening element
70 wet saw
72 wet saw table
74 wet saw stand
76 wet saw blade
78 fluid
80 waterproof light
82 overspray
84 pump
86 pump actuator

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
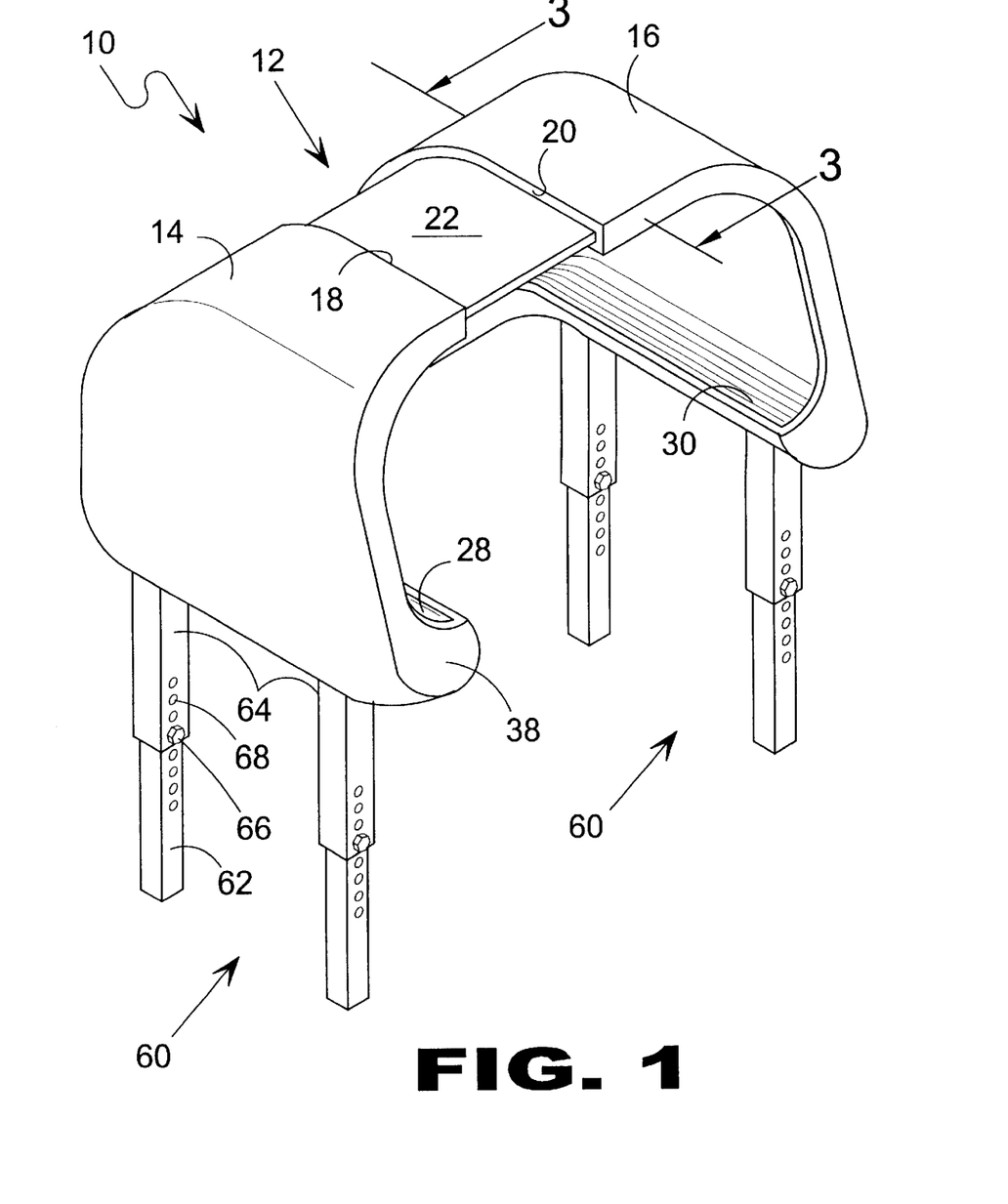
FIG. 1 is a perspective view of the present invention.

Referring to FIG. 1, shown is a perspective view of the present invention. The present invention is a wet saw shield housing 10 comprised of a housing shell 12 formed of two opposing sections 14, 16, with one section having an extension member 22 forming an integral part of said section and the opposing section having channel means for receiving the extension. The sections 14, 16 having an interiorly positioned trough 28, 30 respectively. The opposing sections can be moved from a position wherein the edge 18 of one section 14 abuts the edge 20 of the opposing section 16. The housing is also comprised of telescoping legs 60. Each leg 60 has a first section 64 having a throughbore for receiving the extendable part 62. Both 62 and 64 having a plurality of apertures 68 that can be aligned for the insertion of fastener 66. The invention 10 is used for selectively adjusting the width of the housing 12 to accommodate tables and saws of various sizes. The embodiment shown illustrates one way in which the present invention 10 may be adapted to accommodate work areas of varying heights and widths. Adjusting the height of the wet saw water shield is accomplished using selectively adjustable telescoping leg members 60.

Figure 2:
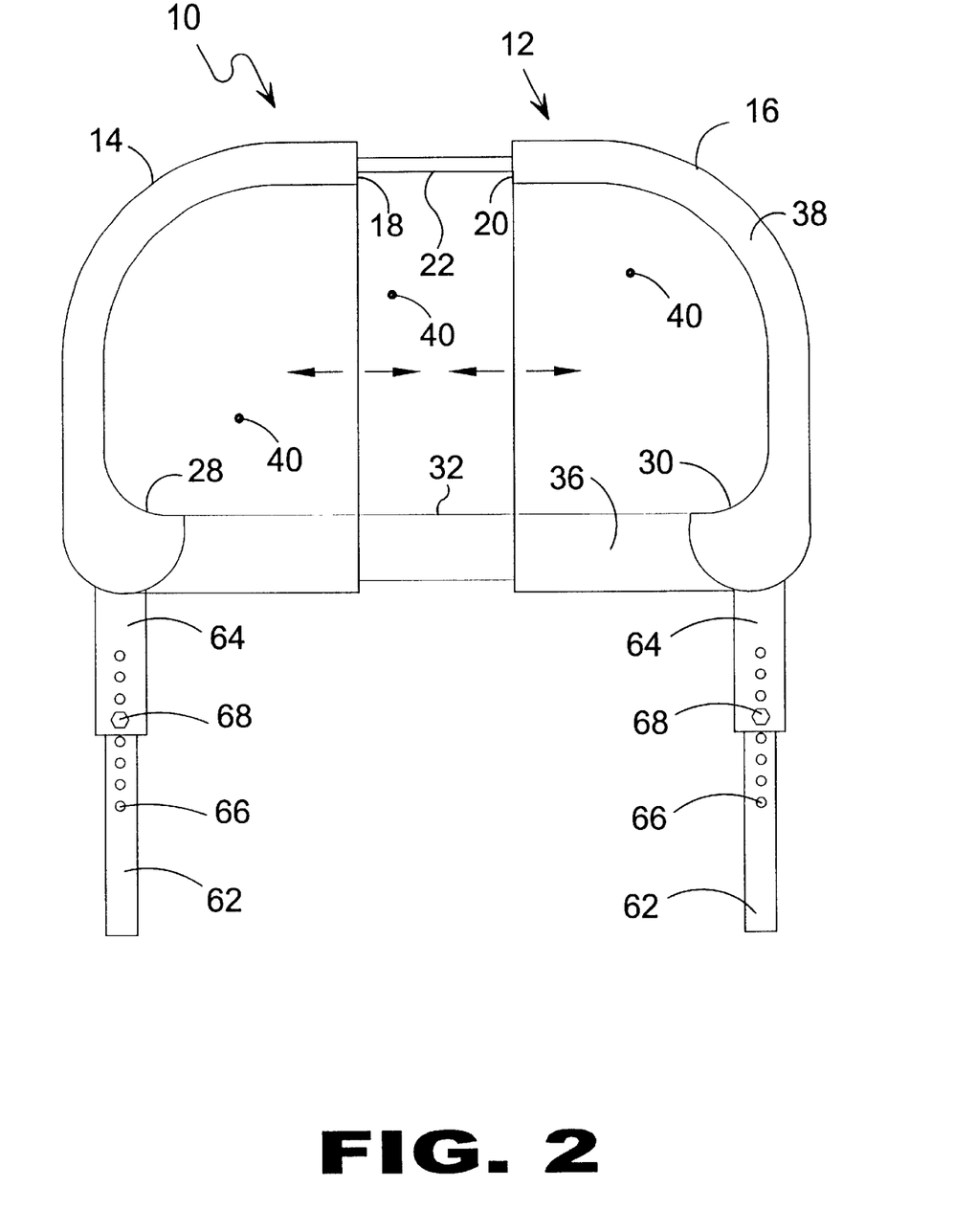
FIG. 2 is a front view of the present invention.

Referring to FIG. 2, shown is a front view of the present invention 10. The two housing sections 14, 16 may be abutted by move edge 18 of the first section into engagement with edge 20 of the second section 16 whereby the extension member 22 will be contained within the second section 16 or the sections 14, 16 can be space apart by the extension member 22 of section 14 while the housing interior surface area 40 is maintained by the interior surface area 40 of the extension member 22. The extension member 22 also has a trough element 32 that connect the trough members 28, 30 of the opposing sections. Also shown are the extendable retractable legs 60 comprised of leg member 62, 64 having apertures 66 for the insertion therethrough of fastener 68. The telescoping legs provide for leveling of housing 12 irrespective of the ground or floor heights.

Figure 3:
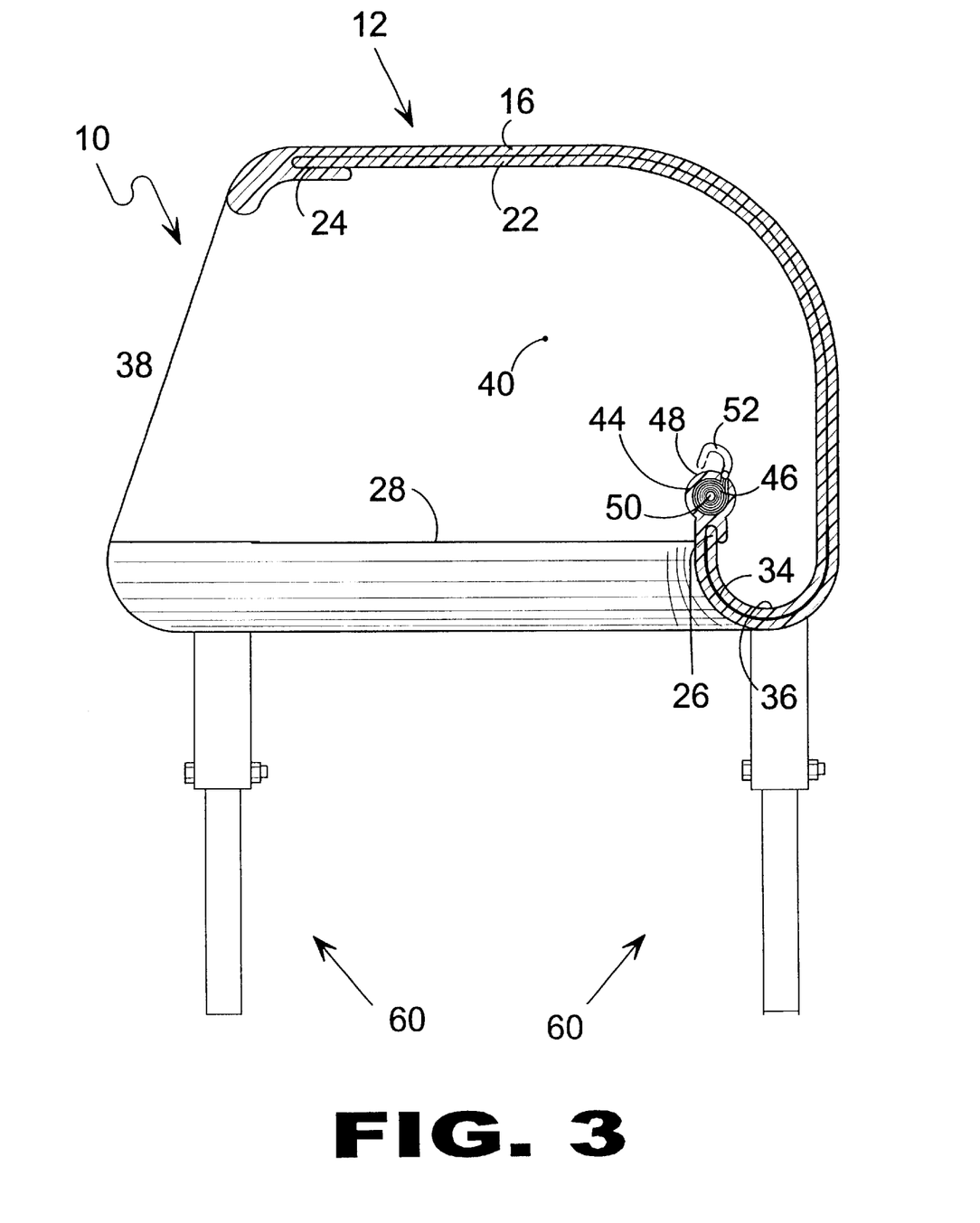
FIG. 3 is a sectional side view of the present invention.

Referring to FIG. 3, shown is a cross sectional side view of the present invention 10, taken from FIG. 1 as indicated. The expansion insert 22 is configured substantially similar to the housing sections 14, 16 and is inserted therein end-to-end in tongue 22 and groove 24, 26 fashion to allow the user to selectively expand or contract the housing member as needed. The engaging troughs have gasket 34 positioned therebetween to prevent leaks. Also shown is the extendable retractable membrane housing 44 having extendable retractable impermeable sheet 46 having a hook element 52 for holding the sheet in the extended position and spring mechanism 50 for retracting the impermeable sheet 46 back into housing 48 when not in use.

Figure 4:
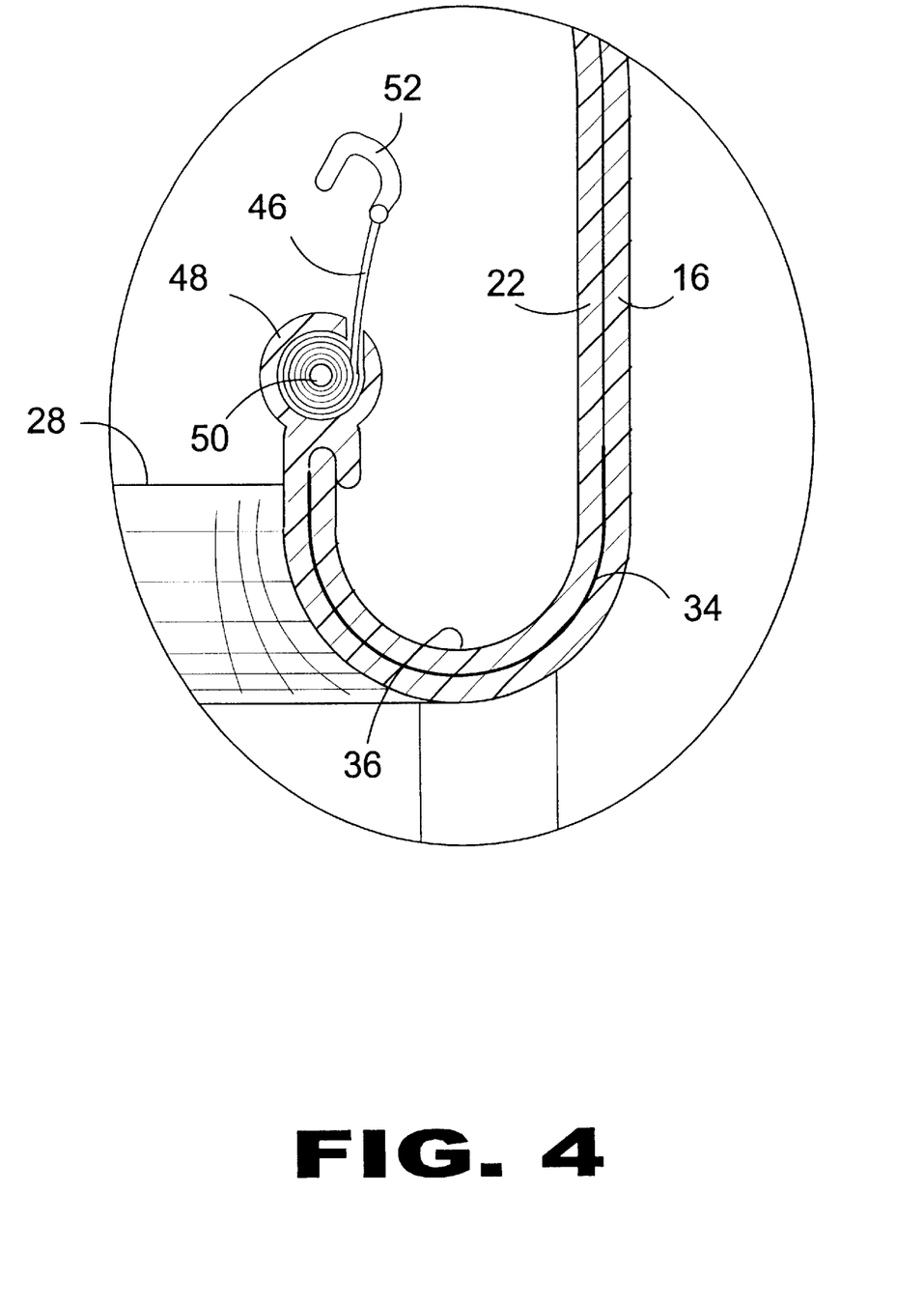
FIG. 4 is a detailed sectional side view of the retractable backsplash assembly.

Referring to FIG. 4, shown is an enlarged sectional view of the retractable backsplash assembly 44. The expansion insert 22 is configured of similar dimensions as housing sections 14, 16. The extension member 22 forming the tongue seats into groove 26 and groove 24 as shown in FIG. 3. The trough 36 of extension member 22 engaging the trough of the opposing section 16 has gasket 34 positioned therebetween to prevent any fluid flow between the mating surface of the engaged troughs. Also shown is the extendable retractable membrane housing 44 having extendable retractable impermeable sheet 46 having a hook element 52 for holding the sheet in the extended position and spring mechanism 50 for retracting the impermeable sheet 46 back into housing 48 when not in use.

Figure 5:
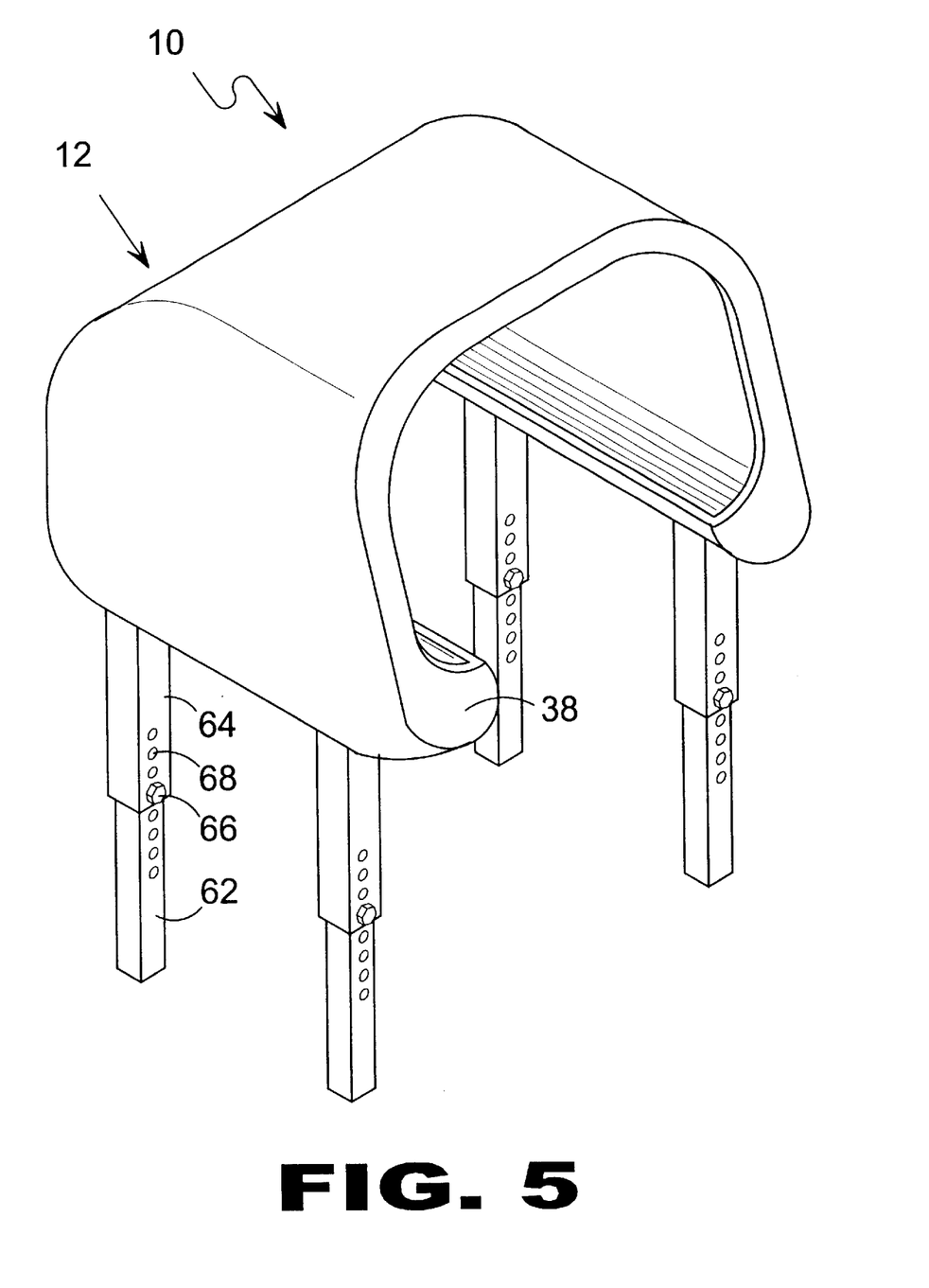
FIG. 5 is a perspective view of the present invention.

Referring to FIG. 5, shown is a perspective view of the present invention 10 with a unibody construction 12. This alternate of the present invention is a wet saw water shield 10 designed to contain the effluent overspray of water that is ejected by the rotating saw blade. The water shield has a unibody housing member 12 that encloses the sides, rear and top of the wet saw and stand. Channels projecting inwardly from the bottom of the housing form a peripheral basin to catch the effluence where a pump can be used to return the fluid to the saw. Selectively extendable legs permit the user to adjust the height accordingly.

Figure 6:
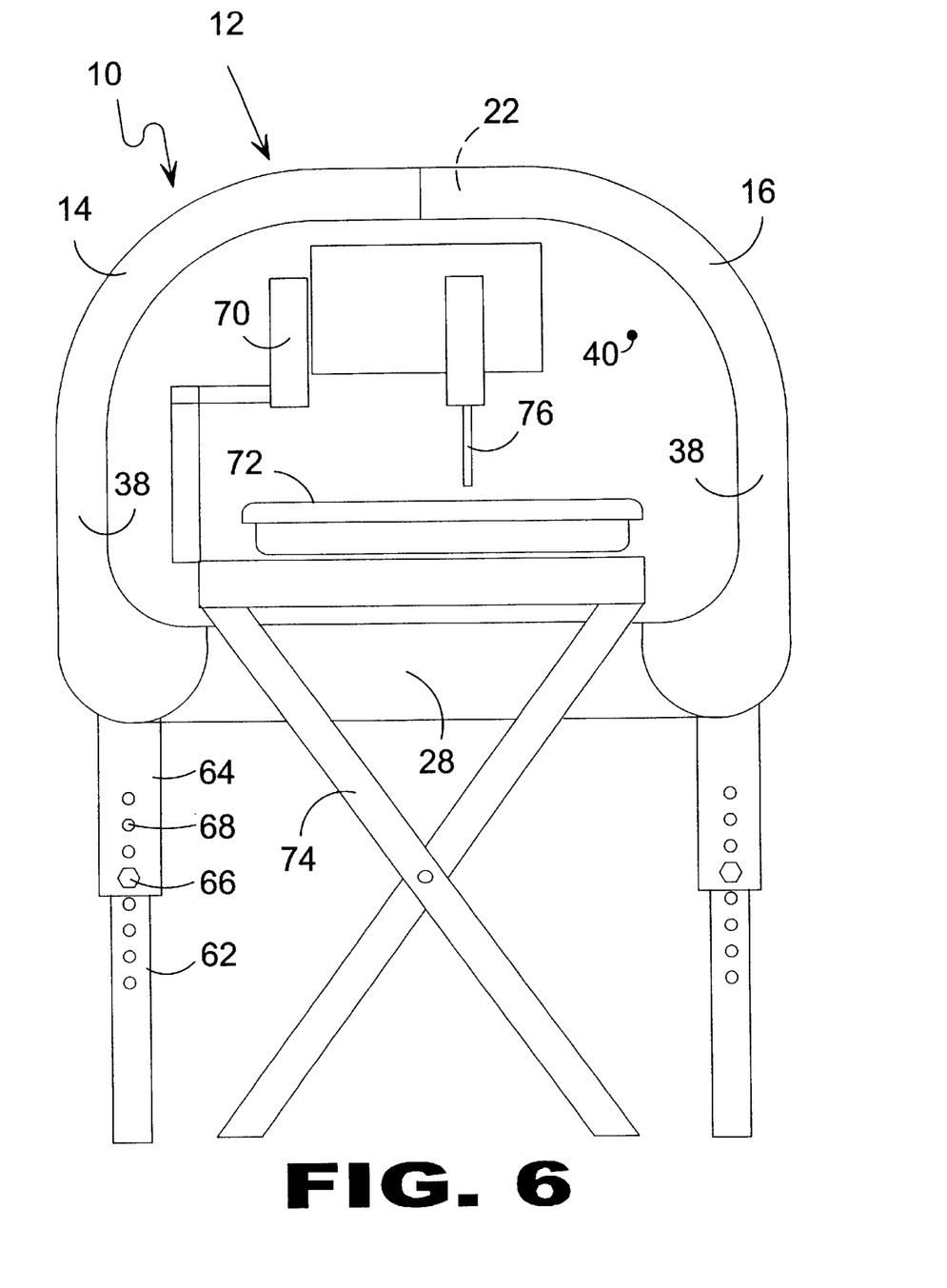
FIG. 6 is a front view of the present invention.

Referring to FIG. 6, shown is a front view of the present invention 10 ready for use with a wet saw. Telescoping legs allow the user to adjust the height appropriately with respect to the wet saw 70 and its stand 74. A plurality of apertures 68 in the male portion 62 of each leg correspond with a plurality of apertures 68 in the female portion 64 and a bolt 66 or other appropriate securing means locks the legs in place. The front of the housing is open to provide access to the wet saw by the user. The housing member is transparent or translucent to permit light to enter the work area although a waterproof light fixture may be installed therein.

Figure 7:
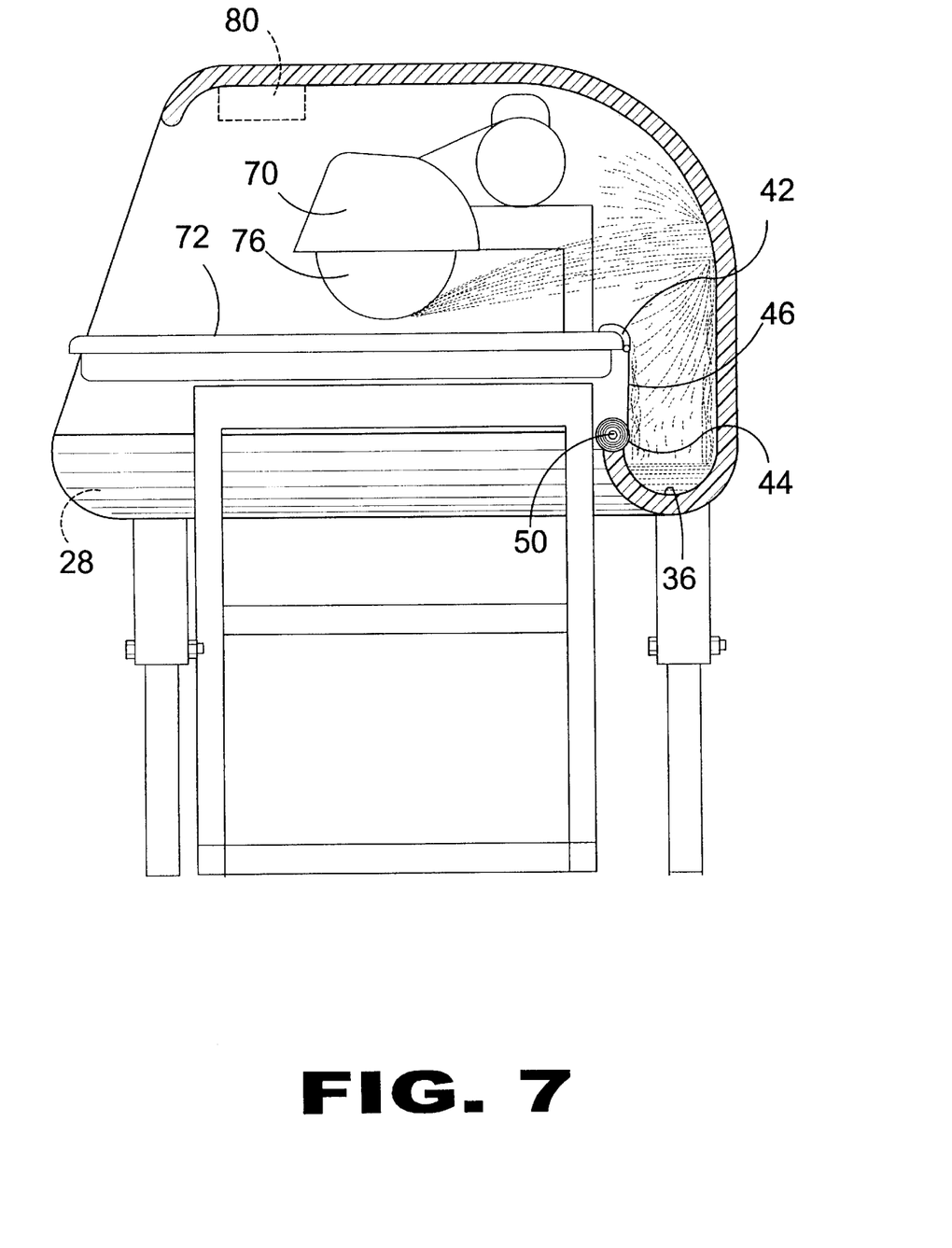
FIG. 7 is a sectional side view of the present invention in use.

Referring to FIG. 7, shown is a sectional side view of the present invention 10. The primary objective of the present invention is to allow the user to significantly reduce or eliminate overspray or drippage that normally occurs during the operation of a wet saw 70 thereby enabling the operator to set up the wet saw 70 indoors in the general vicinity of the area being tiled. The recycling trough 36 collects most of the overspray but the water is ejected away from the saw 70 by blade 76 causing the bulk of the overspray to hit the housing member with adequate trajectory to result in a splashback that can allow the water to escape through the gap between the trough lip and the table. The present invention seeks to overcome this shortcoming by providing a retractable impermeable sheet 46 that is mounted onto or integral with the lip of the rear portion of the trough. One end of the backsplash sheet is fixed to a spring-loaded shaft 50 and the external end has at least one hook member 42 for grabbing the lip portion of the water tray of the wet saw thereby creating a backsplash that prohibits the egress of errant fluid and directs it into the recycling trough 36 where a typical submersible pump that may be included with all wet saws may be placed to replenish the fluid for the saw.

Figure 8:
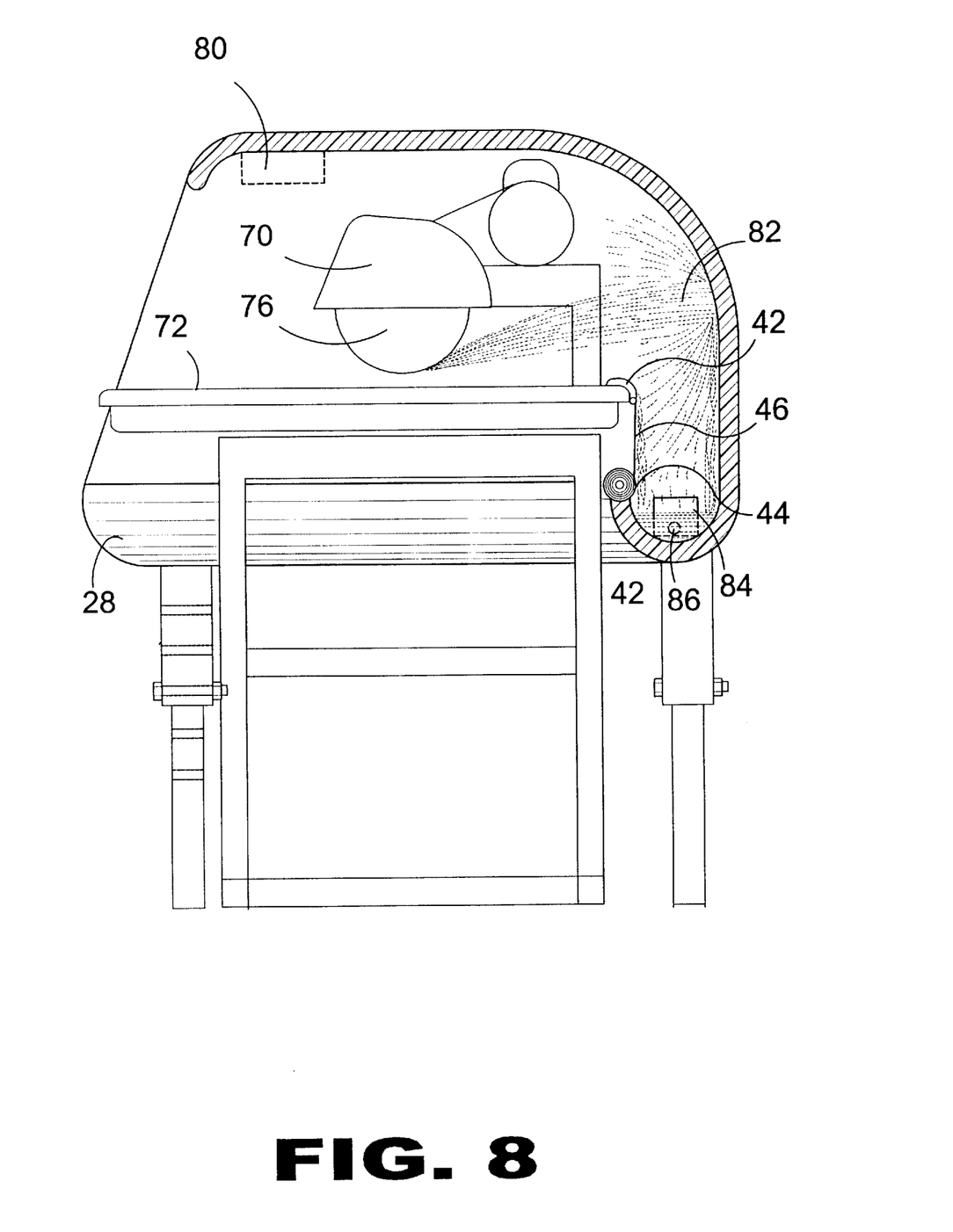
FIG. 8 shown is a sectional side view of an additional element of the present invention.

Referring to FIG. 8, shown is a sectional side view of an additional element of the present invention 10. The present invention has a retractable rubber backsplash sheet 46 that is mounted onto or integral with 44 the lip of the rear portion of the trough. One end of the backsplash sheet 46 is fixed to a spring-loaded shaft 50 and the external end has at least one hook member 42 for grabbing the lip portion of the water tray of the wet saw thereby creating a backsplash that prohibits the egress of errant fluid and directs it into the recycling trough where a submersible pump having a self activating float replenishes the fluid for the saw. The shield housing can also incorporate an internal watertight light fixture 80 and a pump 84 having actuator 86 for pump the fluid to a predetermined destination.

What is claimed is new and desired to be protected by Letters Patent is set forth in the appended claims:

1. A portable housing for a wet saw comprising:
   a) a housing having a top surface, spaced apart side walls and a back wall;
   b) a trough extending from the front end of one side along the back wall to the front end of the other side;
   c) the housing having one side and an opposing side which are slidably engagable with each other; and
   d) one side of said housing having a tongue conforming substantially to the contour of the opposing side for the length of said tongue.

2. The device as recited in claim 1, wherein the opposing side receiving the tongue has spaced apart channels for receiving the spaced apart edges of the tongue.

3. The device as recited in claim 1, wherein said opposing side having a trough has a lining element positioned on the interior side of the trough substantially extending for the length of the engaging tongue trough.

4. The device as recited in claim 3, wherein said lining element forms a sealing element between said tongue trough and opposing side trough to prevent fluid from passing therebetween.

5. The device as recited in claim 1, wherein the housing extends in a curvilinear form creating a front lip that encompasses the trough forming an impermeable end wall for fluid containment therein.

6. The device as recited in claim 1, wherein the opposing side having a trough receiving channel has an integral structure positioned over said channel having a cavity therein with an exteriorly positioned slot providing access to said cavity.

7. The device as recited in claim 6, where within said cavity of said integral structure there is an extendable retractable impermeable sheet positioned therein.

8. The device as recited in claim 7, wherein the impermeable sheet extends substantially from one distal end of said integral structure to the other distal end.

9. The device as recited in claim 8, wherein said impermeable sheet has a hook-like member attached thereto forming a releasable fastening means for holding said impermeable sheet in an extended position.

10. The device as recited in claim 7, further comprising a tensioned spring mechanism providing means for retracting said impermeable sheet into said integral housing.

11. The device as recited in claim 1, further comprising an interiorly positioned light having means for turning said light on and off.

12. The device as recited in claim 6, further comprising a pump for pumping the fluid from the trough to another designated area.

13. The device of claim 12, wherein said pump has an activation switch positioned within said trough for engaging said pump based upon fluid level within said trough.

* * * * *